US012643313B2

(12) United States Patent
Feng et al.

(10) Patent No.: US 12,643,313 B2
(45) Date of Patent: Jun. 2, 2026

(54) LINERS FOR HIGH TEMPERATURE MATERIALS

(71) Applicant: Dow Global Technologies LLC, Midland, MI (US)

(72) Inventors: Jichang Feng, Shanghai (CN); Jianping Pan, Shanghai (CN); Xiaobing Yun, Shanghai (CN); Shijun Wang, Shanghai (CN); Bo Lyu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 175 days.

(21) Appl. No.: 18/040,172

(22) PCT Filed: Oct. 19, 2020

(86) PCT No.: PCT/CN2020/121942
§ 371 (c)(1),
(2) Date: Feb. 1, 2023

(87) PCT Pub. No.: WO2022/082369
PCT Pub. Date: Apr. 28, 2022

(65) Prior Publication Data
US 2023/0302776 A1 Sep. 28, 2023

(51) Int. Cl.
*B32B 27/08* (2006.01)
*B32B 7/02* (2019.01)
(Continued)

(52) U.S. Cl.
CPC ................ *B32B 27/08* (2013.01); *B32B 7/02* (2013.01); *B32B 7/12* (2013.01); *B32B 27/32* (2013.01);
(Continued)

(58) Field of Classification Search
CPC .. B32B 7/02; B32B 7/12; B32B 27/08; B32B 27/32; B32B 2307/31; B32B 2307/54;
(Continued)

(56) References Cited

U.S. PATENT DOCUMENTS

2015/0158235 A1* 6/2015 Van Loon ............... B32B 27/32
428/218
2017/0008253 A1 1/2017 Su et al.
2017/0008263 A1 1/2017 Hu et al.

FOREIGN PATENT DOCUMENTS

EP 1736309 12/2006
EP 2797742 11/2014
(Continued)

OTHER PUBLICATIONS

PCT/CN2020/121942, International Search Report and Written Opinion with a mailing date of May 27, 2021.

*Primary Examiner* — Maria V Ewald
*Assistant Examiner* — Ethan Weydemeyer
(74) *Attorney, Agent, or Firm* — Jacob R. Graham

(57) ABSTRACT

Provided are liners suitable for use in a bulk container. The liners can hold high temperature materials (e.g., materials reaching temperatures greater than 120° C.) and can comprise at least one ply including polyethylene. The liners can exhibit high dart impact and can provide a balance of stiffness, toughness, and seal strength. The at least one ply of the liner according to embodiments disclosed herein comprises a first layer, a tie layer, and a second layer, wherein the tie layer is disposed between the first layer and the second layer. In further embodiments, the at least one ply of the liner can include a second tie layer and a third layer, wherein the second tie layer is disposed between the first layer and the third layer.

6 Claims, 1 Drawing Sheet

(51) Int. Cl.
    *B32B 7/12*           (2006.01)
    *B32B 27/32*         (2006.01)

(52) U.S. Cl.
    CPC ..... *B32B 2250/242* (2013.01); *B32B 2307/31*
          (2013.01); *B32B 2307/54* (2013.01); *B32B*
             *2307/558* (2013.01); *B32B 2307/5825*
               (2013.01); *B32B 2439/00* (2013.01)

(58) Field of Classification Search
    CPC ...... B32B 2307/558; B32B 2307/5825; B32B
                                 2439/00
    See application file for complete search history.

(56)                 References Cited

FOREIGN PATENT DOCUMENTS

| | | | |
|---|---|---|---|
| WO | 2007044544 | 4/2007 | |
| WO | 2009073685 | 6/2009 | |
| WO | 2012009043 | 1/2012 | |
| WO | WO-2013027844 A1 * | 2/2013 | .......... B32B 27/306 |
| WO | 2015127026 | 8/2015 | |
| WO | 2017210423 | 12/2017 | |
| WO | 2018191151 | 10/2018 | |

* cited by examiner

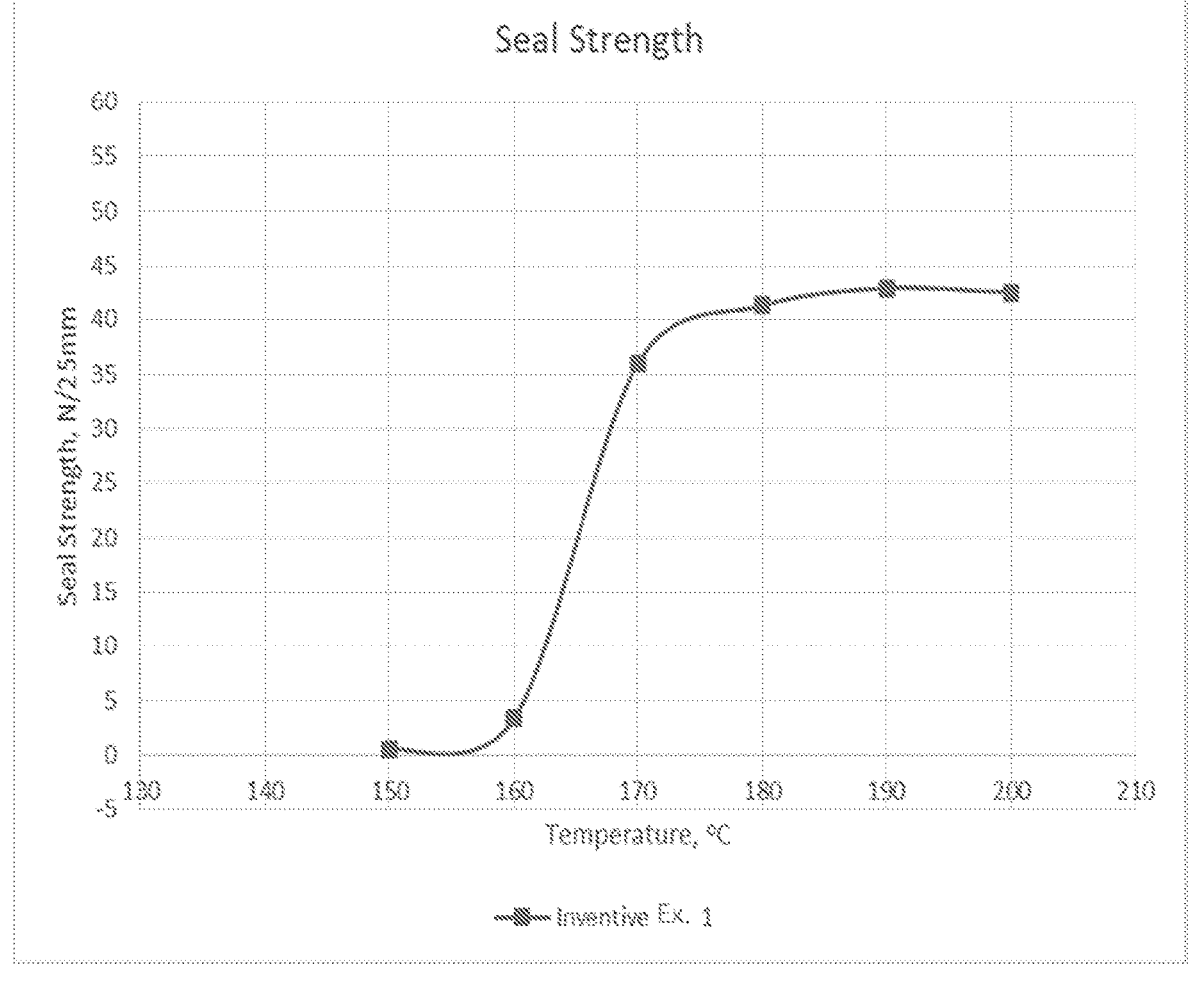

LINERS FOR HIGH TEMPERATURE MATERIALS

TECHNICAL FIELD

Embodiments of the present disclosure generally relate to liners suitable for use in bulk containers, and more particularly relate to liners that can hold high temperature materials.

INTRODUCTION

In flexible packaging applications, high temperature materials, such as asphalt, are filled into liners of bulk containers. The plies of liners holding the high temperature materials need a good balance of stiffness and toughness. High temperature materials (e.g., materials reaching temperatures greater than 120° C.) cannot be packaged in traditional polyethylene plies because the melting point of polyethylene is typically less than 135° C. or 120° C. Polypropylene based plies can have a higher melting point to hold certain high temperature materials, but cannot hold heavy loads due to poor seal strength and dart impact. Accordingly, there is a need to provide plies of liners suitable for use in bulk containers that provide a good balance of properties, including high dart impact and a balance of stiffness, toughness, and seal strength.

SUMMARY

The present invention provides a liner that is suitable for use in a bulk container and that comprises at least one side sidewall comprising at least one ply, where the at least one ply comprises a first layer, a tie layer, and a second layer. In embodiments, the at least one ply can further comprise a second tie layer and a third layer. The present invention provides a liner that can hold high temperature materials and that can comprise a ply with high dart impact and a balance of stiffness, toughness, and seal strength.

Disclosed herein is a liner. The liner comprises at least one sidewall comprising at least one ply, the at least one ply comprising: a first layer comprising at least 70 wt. %, based on total weight of the first layer, of a polyethylene; a tie layer comprising at least 60 wt. %, based on total weight of the tie layer, of a propylene-based elastomer having a density in the range of from 0.850 g/cc to 0.900 g/cc and a melt flow rate of from 1 to 8 g/10 min; and a second layer having a melting point of greater than 140° C. and comprising at least 50 wt. %, based on total weight of the second layer, of a polypropylene having a density of from 0.890 to 0.910 g/cc and melt flow rate of from 1 to 5 g/10 min; and wherein the tie layer is disposed between the first layer and the second layer; and wherein the at least one ply has a Dart Impact Type A of greater than 5 g/μm.

These and other embodiments are described in more detail in the Detailed Description.

BRIEF DESCRIPTION OF THE DRAWINGS

FIG. 1 is a heat seal strength graph of Inventive Example 1.

DETAILED DESCRIPTION

Aspects of the disclosed liners are described in more detail below. The liners can be suitable for use in bulk containers and can have a wide variety of other applications, including, for example, pouches, stand-up pouches, bulk bags, pre-made packages, sachets, or the like. This disclosure, however, should not be construed to limit the embodiments set forth below as this disclosure is an illustrative implementation of the embodiments described herein.

As used herein, the term "polymer" means a polymeric compound prepared by polymerizing monomers, whether of the same or a different type. The generic term polymer thus embraces the term homopolymer (employed to refer to polymers prepared from only one type of monomer), and the term copolymer or interpolymer. Trace amounts of impurities (for example, catalyst residues) may be incorporated into and/or within the polymer. A polymer may be a single polymer, a polymer blend, or a polymer mixture, including mixtures of polymers that are formed in situ during polymerization.

As used herein, the terms "polyethylene" or "ethylene-based polymer" shall mean polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); ethylene-based plastomers (POP) and ethylene-based elastomers (POE); Medium Density Polyethylene (MDPE); and High Density Polyethylene (HDPE). These polyethylene materials are generally known in the art.

As used herein, the term "polypropylene" refers to a polymer that contains more than 50 weight percent of polymerized propylene monomer (based on the total amount of polymerizable monomers) and, optionally, can contain at least one comonomer.

As used herein, the term "sidewall" refers to a piece of polymer film that is sealed to itself or another sidewall by, for example, welding or an adhesive, to form a liner or bag.

As used herein, the term "ply" refers to a part of a sidewall that may be a polymer film. A single wound polymer film provides one ply and a double wound polymer film provides two plies. A ply may be an extruded blown film.

As used herein, the term "tie layer" refers to a layer of a film or ply placed on one or more layers to promote the adhesion of that layer to another surface or layer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The liner disclosed herein comprises at least one sidewall. The sidewall may be sealed to itself or to another sidewall to form a liner. The liner and sidewall comprise at least one ply, the at least one ply comprising a first layer, a tie layer, and a second layer. The liner can comprise 1, 2, 3, 4, 5, 6, or more plies according to embodiments disclosed herein.

The first layer comprises at least 70 wt. %, based on total weight of the first layer, of a polyethylene. All individual values and subranges of at least 70 wt. % are disclosed and included herein. For example, in embodiments, the first layer can comprise at least 70 wt. %, at least 80 wt. %, at least 90 wt. %, at least 95 wt. %, at least 99 wt. %, or at least 99.9 wt. % of a polyethylene, based on total weight of the first layer. In other embodiments, the first layer can comprise from 70 to 100 wt. %, from 80 to 100 wt. %, or from 90 to 100 wt. %, of a polyethylene, based on the total weight of the first layer.

In embodiments, the first layer comprises greater than 30 wt. % of the at least one ply, based on total weight of the at least one ply. All individual values and subranges of greater than 30 wt. % are disclosed and included herein. For example, in embodiments, the first layer can comprise greater than 30 wt. %, greater than 40 wt. %, greater than 50 wt. %, or greater than 60 wt. % of the at least one ply.

In embodiments, the polyethylene of the first layer has a density of less than 0.920 g/cc. All individual values and subranges of a density of less than 0.920 g/cc are disclosed and included herein. For example, in embodiments, the polyethylene of the first layer can have a density of less than 0.920 g/cc, less than 0.918 g/cc, less than 0.916 g/cc, or less than 0.914 g/cc.

In embodiments, the polyethylene of the first layer has a melt index ($I_2$) of less than 2.0 g/10 min. All individual values and subranges of a melt index ($I_2$) of less than 2.0 g/10 min are disclosed and included herein. For example, the polyethylene of the first layer can have a melt index ($I_2$) of less than 2.0 g/10 min, less than 1.8 g/10 min, less than 1.6 g/10 min, less than 1.4 g/10 min, less than 1.2 g/10 min, less than 1.0 g/10 min, or less than 0.9 g/10 min.

Examples of commercially available polyethylenes that can be used in some embodiments include INNATE™ TH60 available from The Dow Chemical Company, Midland, MI.

The at least one ply comprises a tie layer. The tie layer is disposed between the first layer and the second layer. The tie layer can adhere the first layer to the second layer.

The tie layer comprises at least 60 wt. %, based on total weight of the tie layer, of a propylene-based elastomer having a density in the range of from 0.850 g/cc to 0.900 g/cc and a melt flow rate of from 1 to 8 g/10 min. All individual values and subranges of at least 60 wt. % are disclosed and included herein. For example, in embodiments, the tie layer can comprise at least 60 wt. %, at least 70 wt. %, at least 80 wt. %, at least 90 wt. %, at least 95 wt. %, at least 99 wt. %, or at least 99.9 wt. % of a propylene-based elastomer, based on total weight of the tie layer. In other embodiments, the tie layer can comprise from 60 to 100 wt. %, 70 to 100 wt. %, from 80 to 100 wt. %, or from 90 to 100 wt. %, of a propylene-based elastomer, based on the total weight of the tie layer.

The propylene-based elastomer of the tie layer has a density in the range of from 0.850 g/cc to 0.900 g/cc. All individual values and subrange of from 0.850 g/cc to 0.900 g/cc are disclosed and included herein. For example, in embodiments, the propylene-based elastomer can have a density in the range of from 0.850 g/cc to 0.890 g/cc, from 0.855 g/cc to 0.890 g/cc, from 0.860 g/cc to 0.890 g/cc, from 0.865 g/cc to 0.890 g/cc, from 0.855 g/cc to 0.900 g/cc, from 0.860 g/cc to 0.900 g/cc, or from 0.865 g/cc to 0.900 g/cc.

The propylene-based elastomer of the tie layer has a melt flow rate of from 1 to 8 g/10 min. All individual values and subranges of from 1 to 8 g/10 min are disclosed and included herein. For example, the propylene-based elastomer of the tie layer can have a melt flow rate of from 1 to 8 g/10 min, from 1 to 7 g/10 min, from 1 to 6 g/10 min, from 1 to 5 g/10 min, from 1 to 4 g/10 min, or from 1 to 3 g/10 min.

Examples of commercially available propylene-based elastomers that can be used in some embodiments include VERSIFY™ 2300 and VERSIFY™ 2000 available from The Dow Chemical Company, Midland, MI.

The at least one ply comprises a second layer. In embodiments, the second layer forms the interior surface of the enclosed liner that can be exposed to high temperature materials. In embodiments, the second layer has a melting point of greater than 140° C. and comprises at least 50 wt. %, based on total weight of the second layer, of a polypropylene having a density of from 0.890 to 0.910 g/cc and melt flow rate of from 1 to 5 g/10 min.

The polypropylene of the second layer has a density of from 0.890 to 0.910 g/cc. All individual values and subranges of from 0.890 to 0.910 g/cc are included and disclosed herein. For example, the polypropylene of the second layer can have a density of from 0.890 to 0.910 g/cc, from 0.895 to 0.910 g/cc, from 0.900 to 0.910 g/cc, from 0.890 g/cc to 0.905 g/cc, from 0.895 to 0.905 g/cc, or from 0.900 to 0.905 g/cc.

The polypropylene of the second layer has a melt flow rate of from 1 to 5 g/10 min. All individual values and subranges of from 1 to 5 g/10 min are included and disclosed herein. For example, the polypropylene of the second layer can have a melt flow rate of from 1 to 5 g/10 min, from 1 to 4 g/10 min, or from 2 to 4 g/10 min.

In embodiments, the polypropylene of the second layer is a homopolypropylene.

In embodiments, the second layer further comprises a propylene/ethylene copolymer. In embodiments where a propylene/ethylene copolymer is present in the second layer, the second layer can comprise up to 50 wt. % of the propylene/ethylene copolymer, based on total weight of the second layer. All individual values and subranges of up to 50 wt. % are disclosed and included herein. For example, in embodiments, the second layer can comprise up to 50 wt. %, up to 40 wt. %, up to 30 wt. %, or up to 25 wt. % of the propylene/ethylene copolymer.

In embodiments where a propylene/ethylene copolymer is present in the second layer, the propylene/ethylene copolymer can have a density in the range of from 0.890 to 0.910 g/cc. All individual values and subranges of from 0.890 to 0.910 g/cc are included and disclosed herein. For example, the propylene/ethylene copolymer of the second layer can have a density of from 0.890 to 0.910 g/cc, from 0.895 to 0.910 g/cc, from 0.900 to 0.910 g/cc, from 0.890 g/cc to 0.905 g/cc, from 0.895 to 0.905 g/cc, or from 0.900 to 0.905 g/cc.

In embodiments, the at least one ply further comprises a second tie layer and a third layer. In such embodiments, the second tie layer is disposed between the first layer and the third layer of the at least one ply. The second tie layer can adhere the first layer to the third layer. In embodiments, the second tie layer can have the same composition as the tie layer that is disposed between the first layer and the second layer. In other embodiments, the second tie layer can have a different composition than the tie layer.

In embodiments, the second tie layer comprises at least 60 wt. %, based on total weight of the second tie layer, of a second propylene-based elastomer having a density in the range of from 0.850 g/cc to 0.900 g/cc and a melt flow rate of from 1 to 8 g/10 min. All individual values and subranges of at least 60 wt. % are disclosed and included herein. For example, in embodiments, the second tie layer can comprise at least 60 wt. %, at least 70 wt. %, at least 80 wt. %, at least 90 wt. %, at least 95 wt. %, at least 99 wt. %, or at least 99.9 wt. % of the second propylene-based elastomer, based on total weight of the second tie layer. In other embodiments, the second tie layer can comprise from 60 to 100 wt. %, 70 to 100 wt. %, from 80 to 100 wt. %, or from 90 to 100 wt. %, of the second propylene-based elastomer, based on the total weight of the second tie layer.

In embodiments, the second propylene-based elastomer has a density in the range of from 0.850 g/cc to 0.900 g/cc. All individual values and subrange of from 0.850 g/cc to 0.900 g/cc are disclosed and included herein. For example, in embodiments, the second propylene-based elastomer can have a density in the range of from 0.850 g/cc to 0.890 g/cc, from 0.855 g/cc to 0.890 g/cc, from 0.860 g/cc to 0.890 g/cc, from 0.865 g/cc to 0.890 g/cc, from 0.855 g/cc to 0.900 g/cc, from 0.860 g/cc to 0.900 g/cc, or from 0.865 g/cc to 0.900 g/cc.

In embodiments, the second propylene-based elastomer has a melt flow rate of from 1 to 8 g/10 min. All individual values and subranges of from 1 to 8 g/10 min are disclosed and included herein. For example, the second propylene-based elastomer can have a melt flow rate of from 1 to 8 g/10 min, from 1 to 7 g/10 min, from 1 to 6 g/10 min, from 1 to 5 g/10 min, from 1 to 4 g/10 min, or from 1 to 3 g/10 min.

In embodiments where the at least one ply further comprises a second tie layer and a third layer, the third layer can have the same composition or a different composition than the second layer of the at least one ply. In embodiments, the third layer has a melting point greater than 140° C. and comprises at least 50 wt. %, based on the total weight of the third layer, of a second polypropylene having a density of from 0.890 to 0.910 g/cc and melt flow rate of from 1 to 5 g/10 min.

In embodiments, the third layer comprises at least 50 wt. %, based on total weight of the third layer, of a second polypropylene. All individual values and subranges of at least 50 wt. % are disclosed and included herein. For example, in embodiments, the third layer can comprise at least 50 wt. %, at least 60 wt. %, at least 70 wt. %, at least 80 wt. %, at least 90 wt. %, at least 95 wt. %, at least 99 wt. %, or at least 99.9 wt. % of the second polypropylene, based on total weight of the third layer. In other embodiments, the third layer can comprise from 50 to 100 wt. %, from 60 to 100 wt. %, 70 to 100 wt. %, from 80 to 100 wt. %, or from 90 to 100 wt. %, of the second polypropylene, based on the total weight of the third layer.

In embodiments, the second polypropylene has a density of from 0.890 to 0.910 g/cc. All individual values and subranges of from 0.890 to 0.910 g/cc are included and disclosed herein. For example, the second polypropylene can have a density of from 0.890 to 0.910 g/cc, from 0.895 to 0.910 g/cc, from 0.900 to 0.910 g/cc, from 0.890 g/cc to 0.905 g/cc, from 0.895 to 0.905 g/cc, or from 0.900 to 0.905 g/cc.

In embodiments, the second polypropylene has a melt flow rate of from 1 to 5 g/10 min. All individual values and subranges of from 1 to 5 g/10 min are included and disclosed herein. For example, the second polypropylene can have a melt flow rate of from 1 to 5 g/10 min, from 1 to 4 g/10 min, or from 2 to 4 g/10 min.

In embodiments, the second polypropylene is a homopolypropylene.

Additives

It should be understood that any of the foregoing layers of the at least one ply can further comprise one or more additives as known to those of skill in the art such as, for example, antioxidants, ultraviolet light stabilizers, thermal stabilizers, slip agents, antiblock agents, antistatic agents, pigments or colorants, processing aids, crosslinking catalysts, flame retardants, fillers and foaming agents.

The at least one ply disclosed herein can have a variety of thicknesses depending, for example, on the number of layers. For example, in embodiments, the at least one ply can have a thickness of from 10 to 200 microns, or alternatively, of from 50 to 150 microns.

The at least one ply can have several desirable properties. For example, in embodiments, the at least one ply has a Dart Impact A of greater than 5 g/$\mu$m, where Dart Impact A is measured in accordance with ASTM D1709. All individual values and subranges of a Dart Impact A of greater than 5 g/$\mu$m are disclosed and included herein. For example, the at least one ply can have a Dart Impact A of greater than 5 g/$\mu$m, greater than 7 g/$\mu$m, greater than 9 g/$\mu$m, greater than 11 g/$\mu$m, or greater than 13 g/$\mu$m, where Dart Impact A is measured in accordance with ASTM D1709.

In embodiments, the at least one ply has a plateau seal strength greater than 35 N/25 mm, where plateau seal strength can be measured in accordance with the test method described below. All individual values and subranges of a plateau seal strength greater than 35 N/25 mm are disclosed and included herein. For example, the at least one ply can have a plateau seal strength greater than 35 N/25 mm, greater than 36 N/25 mm, greater than 37 N/25 mm, or greater than 38 N/25 mm, where plateau seal strength can be measured in accordance with the test method described below.

In embodiments, the at least one ply has a 2% Secant Modulus of greater than 250 MPa in the machine or transverse direction, where 2% Secant Modulus can be measured in accordance with ASTM D882. All individual values and subranges of a 2% Second Modulus of greater than 250 MPa in the machine or transverse direction are disclosed and included herein. For example, the at least one ply can have a 2% Secant Modulus of greater than 250 MPa, greater than 260 MPa, greater than 270 MPa, greater than 280 MPa, or greater than 290 MPa, where 2% Secant Modulus can be measured in accordance with ASTM D882.

Articles

Embodiments of the present invention also provide articles formed from the liners described herein. Examples of such articles can include bulk containers, packages, flexible packages, pouches, and sachets. In embodiments, pouches can comprise a liquid, a powder, a food product, or other items. Articles and packages can be formed from the liner disclosed herein using techniques known to those of skill in the art in view of the teachings herein.

Test Methods

Density

Density is measured in accordance with ASTM D792, and expressed in grams per cubic centimeter (g/cc).

Melt Index ($I_2$)

Melt index ($I_2$) is measured in accordance with ASTM D1238 at 190° C. at 2.16 kg. The values are reported in g/10 min, which corresponds to grams eluted per 10 minutes.

Melt Flow Rate

Melt flow rate is measured in accordance with ASTM D1238, at 230° C./2.16 kg, and is reported in grams eluted per 10 minutes.

Tensile Strength

Tensile strength is measured in accordance with ASMT D882. Tensile strength is reported in megaPascals (MPa).

Elmendorf Tear

Elmendorf Tear (also referred herein as tear resistance) is measured in accordance with ASTM D1922.

7

Puncture Energy and Force

Puncture energy and force is measured in accordance with ASTM D 5748-95 with some modifications: The film sample is cut with 120 mm diameter test area; probe: stainless steel with a diameter of 12.7 mm; testing temperature: room temperature Puncture energy is reported in Joule (J). Puncture force is reported in Newtons (N).

Secant Modulus

Secant Modulus is measured in accordance with ASTM D882.

Dart Impact

Dart Impact Type A is measured in accordance with ASTM 1709A. Dart Impact Type A is reported in grams (g) and grams/micrometer (g/μm), where g/μm is the normalized value of the Dart Impact Type A per the thickness of the sample in micrometer Heat Seal Strength Heat seal measurements are performed on a commercial tensile testing machine according to ASTM F-88 (Technique A). The heat seal test is a gauge of the strength of seals (seal strength) in flexible barrier materials. It does this by measuring the force required to separate a test strip of material containing the seal and identifies the mode of specimen failure. Seal strength is relevant to the opening force and package integrity. Prior to cutting, the films are conditioned for a minimum of 40 hours at 23° C. (±2° C.) and 50% (±5%) R.H. per ASTM D-618 (Procedure A). Strips are then cut from the film in the machine direction to a length of approximately 10 cm and a width of 25 mm. The strips are heat sealed across the machine direction on a J&B Hot Tack 4000 Tester over a range of temperatures under the following conditions: Sealing Pressure=0.275 N/mm$^2$; Sealing Dwell Time=0.5 seconds.

Heat sealed samples are conditioned for 24 hours and then measured using an INSTRON 5965 tensile machine, equipped with a 200 N load cell, and at a pulling speed of 500 mm/min. The strips are tested unsupported. Seal Strength values are reported in N/25 mm. Six replicate tests are performed for each sealing temperature. Plateau seal strength is reported as the peak or highest seal strength value on the heat seal curve of seal strength versus temperature in degrees Celsius. See, for example, FIG. 1, providing a heat seal curve of Inventive Example 1 described below.

EXAMPLES

The following examples illustrate features of the present disclosure but are not intended to limit the scope of the disclosure.

Polymers/Film Used

The following materials are included in the examples discussed below.

INNATE™ TH 60, a polyethylene resin having a density of 0.912 g/cc and melt index (I$_2$) of 0.85 g/10 min and commercially available from The Dow Chemical Company (Midland, MI).

INTUNE™ 5535.00, a crystalline block copolymer having a density of 0.904 g/cc and melt flow rate of 6.5 g/10 min and commercially available from The Dow Chemical Company (Midland, MI).

INTUNE™ 5545.00, a crystalline block copolymer having a density of 0.904 g/cc and melt flow rate of 9.5 g/10 min and commercially available from The Dow Chemical Company (Midland, MI).

VERSIFY™ 2300, a propylene-based elastomer having a density of 0.867 g/cc and melt flow rate of 2.0 g/10 min and commercially available from The Dow Chemical Company (Midland, MI).

VERSIFY™ 2000, a propylene-based elastomer having a density of 0.888 g/cc and melt flow rate of 2.0 g/10 min and commercially available from The Dow Chemical Company (Midland, MI).

FINA 3365, a polypropylene homopolymer having a density of 0.905 g/cc and melt flow rate of 3.8 g/10 min and melting point of 165° C. and commercially available from Total S.A. (Paris, France).

Sanren F800E, a polypropylene/ethylene copolymer having a density of 0.905 g/cc and melt flow rate of 8.0 g/10 min and melting point of 140° C. and commercially available from Sinopec (Beijing, China).

PPH-T03 (T30S), a propylene homopolymer having a density of 0.905 g/cc and melt flow rate of 3.2 g/10 min and melting point of 164° C. and commercially available from Sinopec (Beijing, China).

Three layer and five layer plies are fabricated.

Five layer plies are fabricated on a 7 layer blown film machine with the following parameters-7 Single screw extruders: D=30 mm, L/D=30, max speed 100 rpm, max pressure: 50 MPa; Max output: 35 kg/h; Max haul off speed: 45m/min; 7-layer pancake die; Diameter: 120 mm, Die lip gap: 1.5 mm and 2.2 mm; Max flat width: 500 mm; Max BUR: 2.65; and Cooling: 2.2 kw air blower. The layer ratios of the film machine are adjusted so that there are 5 layers for each of the films fabricated from the 7 layer blown film machine.

Three layer plies are fabricated on a 3 layer blown film machine with the following parameters—Screw: 1.25 inch, L/D=28; Die: 3 inch (Spiral); Cooling: Dual Lip Air Ring; Nominal Outputs: 30-45 kg/hr; Thickness Range: 35-135 μm; Lay flat: 175-350 mm; and BUR Range: 1.5 to 3.0:1.

Table 1 below provides the configuration, layer ratio, and thickness of each of the Comparative Examples (CE) and Inventive Examples (IE) having a five layer structure. Table 2 below provides the configuration, layer ratio, and thickness of each of the examples having a three layer structure. In CE 2 and IE 1 of the five layer structures (A/B/C/D/E), Layers B and D act as a first and second tie layer, and in the three layer structure (A/B/C), Layer B acts as the tie layer. Layer A of the three layer structure and Layer A and E of the five layer structure have a melting point of greater than 140° C.

TABLE 1

Configurations of Five Layer Examples

| | Layer configuration | | | | | Layer | Thickness |
|---|---|---|---|---|---|---|---|
| Name | A | B | C | D | E | ratio | (μm) |
| CE 1 | PPH-T03 | INNATE TH60 | INNATE TH60 | INNATE TH60 | PPH-T03 | 5/2/2/2/5 | 90 |
| CE 2 | PPH-T03 | 80% INTUNE 5545.00 + 20% Sanren F800E | INNATE TH60 | 80% INTUNE 5545.00 + 20% Sanren F800E | PPH-T03 | 3/2/6/2/3 | 70 |
| IE 1 | PPH-T03 | Versify 2000 | INNATE TH60 | Versify 2000 | PPH-T03 | 3/2/6/2/3 | 90 |

TABLE 2

Configurations of Three Layer Examples

| Name | Layer configuration A | Layer configuration B | Layer configuration C | Layer ratio | Thickness (µm) |
|------|---|---|---|---|---|
| CE 3 | FINA 3365 | INNATE TH60 | INNATE TH60 | 1/2/2 | 100 |
| CE 4 | 80% FINA 3365 + 20% Sanren F800E | INNATE TH60 | INNATE TH60 | 1/2/2 | 100 |
| CE 5 | 80% FINA 3365 + 20% Sanren F800E | 80% INTUNE 5535.00 + 20% Sanren F800E | INNATE TH60 | 1/1/3 | 100 |
| CE 6 | FINA 3365 | 80% INTUNE 5545.00 + 20% Sanren F800E | INNATE TH60 | 1/1/3 | 80 |
| IE 2 | FINA 3365 | Versify 2300 | INNATE TH60 | 1/1/3 | 100 |
| IE 3 | 80% FINA 3365 + 20% Sanren F800E | Versify 2300 | INNATE TH60 | 1/1/3 | 100 |

Performance properties of the Comparative and Inventive Examples are measured in accordance with the test methods described above. Table 3 below provides the results for five layered examples, CE 1-2 and IE 1. As can be seen, IE 1 has a surprisingly and significantly higher Dart Impact Type A in comparison to CE 1 and 2. IE 1 also has a good balance of properties, such as toughness and stiffness.

Table 4 below provides the results for three layered examples, CE 3-6 and IE 2-3. As can be seen, IE 2-3 have a surprisingly and significantly higher Dart Impact Type A in comparison to CE 3-6. IE 2-3 also has a good balance of properties, such as toughness and stiffness.

TABLE 3

Performance of CE 1-2 and IE 1

|  | Unit | CE 1 | CE 2 | IE 1 |
|------|------|------|------|------|
| Thickness | µm | 100 | 70 | 90 |
| Dart impact, Type A | g | 102.5 | 135 | 531 |
| Dart impact, Type A | g/µm | 1.03 | 1.93 | 5.90 |
| Tear resistance, MD | g | 114 | 98 | 287 |
| Tear resistance, TD | g | 236 | 135 | 810 |
| Tensile strength, MD | MPa | 29.15 | 44.91 | 46.72 |
| Tensile strength, TD | MPa | 29.06 | 24.88 | 45.27 |
| Elongation, MD | % | 740 | 930 | 929 |
| Elongation, TD | % | 659 | 670 | 985 |
| Puncture energy | J | 4.51 | 2.66 | 3.63 |
| Puncture force | N | 114.76 | 74.14 | 83.45 |
| 2% Secant Modulus, MD | MPa | 796 | 757 | 515 |
| 2% Secant Modulus, TD | MPa | 801 | 739 | 512 |

TABLE 4

Performance of CE 3-6 and IE 2-3

|  | Unit | CE 3 | CE 4 | CE 5 | CE 6 | IE 2 | IE 3 |
|------|------|------|------|------|------|------|------|
| Thickness | µm | 100 | 100 | 100 | 80 | 100 | 100 |
| Dart impact, Type A | g | 246 | 387 | 174 | 171 | 1791 | 1395 |
| Dart impact, Type A | g/µm | 2.46 | 3.87 | 1.74 | 2.14 | 17.91 | 13.95 |
| Tear resistance, MD | g | 855 | 1081 | 1046 | 464 | 1365 | 1001 |
| Tear resistance, TD | g | 1462 | 1764 | 1235 | 875 | 1797 | 1575 |
| Tensile strength, MD | MPa | 44.76 | 43.268 | 33.00 | 40.22 | 36.49 | 33.95 |
| Tensile strength, TD | MPa | 46.57 | 44.622 | 34.00 | 34.71 | 32.25 | 31.02 |
| Elongation, MD | % | 889 | 863 | 881 | 905 | 904 | 870 |
| Elongation, TD | % | 941 | 933 | 943 | 903 | 889 | 899 |
| Puncture energy | J | 7.68 | 7.6 | 4.66 | 4.81 | 6.43 | 5.43 |
| Puncture force | N | 128.82 | 128.44 | 93.4 | 92.75 | 107.22 | 95.35 |
| 2% Secant Modulus, MD | MPa | 410 | 338 | 429 | 415 | 299 | 306 |
| 2% Secant Modulus, TD | MPa | 412 | 338 | 416 | 414 | 298 | 314 |

In addition to the performance properties noted above, the examples are tested for seal strength. Certain Comparative Examples exhibit delamination during pealing for the seal strength test. Table 5 below provides the seal strength results for IE 1-3. FIG. 1 provides the seal strength curve of IE 1. As can be seen, IE 1 has a plateau seal strength greater than 40 N/25 mm; IE 2 has a plateau seal strength greater than 35 N/25 mm; and IE 3 has a plateau seal strength greater than 40 N/25 mm.

TABLE 5

| Seal Strength of IE 1-3 | | | | |
|---|---|---|---|---|
| Seal strength (N/25 mm) | | | | |
| Example | 160° C. | 170° C. | 180° C. | 190° C. | 200° C. |
| IE 1 | 4.3 | 36.3 | 41.3 | 42.8 | 42.5 |
| IE 2 | 2.3 | 24.6 | 37.1 | 39.4 | 39.6 |
| IE 3 | 2.3 | 37.6 | 44.5 | 42.8 | 40.5 |

IE 1 is formed into a liner comprising at least one sidewall suitable for use in bulk container, and is subjected to a hot fill test where hot silicone oil of a temperature of 130° C. fills the liner. When the hot silicone oil is added to the liner, no deformation or leakage is observed.

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A liner suitable for use in a bulk container, the liner comprising:

at least one sidewall comprising at least one ply, the at least one ply comprising:

a first layer comprising at least 70 wt. %, based on total weight of the first layer, of a polyethylene;

a tie layer comprising at least 60 wt. %, based on total weight of the tie layer, of a propylene-based elastomer having a density in the range of from 0.850 g/cc to 0.900 g/cc and a melt flow rate of from 1 to 8 g/10 min; and a second layer having a melting point of greater than 140° C. and comprising at least 50 wt. %, based on total weight of the second layer, of a homopolypropylene having a density of from 0.890 to 0.910 g/cc and melt flow rate of from 1 to 5 g/10 min; and wherein the tie layer is disposed between the first layer and the second layer; and wherein the at least one ply has a Dart Impact Type A of greater than 5 g/μm and wherein the second layer forms an interior surface of the liner.

2. The liner of claim 1, wherein the at least one ply further comprises:

a second tie layer comprising at least 60 wt. %, based on the total weight of the second tie layer, of a second propylene-based elastomer having a density in the range of from 0.850 g/cc to 0.900 g/cc and a melt flow rate of 1 to 8 g/10 mins; and a third layer having a melting point greater than 140° C. and comprising at least 50 wt. %, based on the total weight of the third layer, of a second polypropylene having a density of from 0.890 to 0.910 g/cc and melt flow rate of from 1 to 5 g/10 min;

wherein the second tie layer is disposed between the first layer and the third layer.

3. The liner of claim 1, wherein the first layer comprises greater than 30 wt. % of the at least one ply.

4. The liner of claim 1, wherein the polyethylene of the first layer has a density of less than 0.920 g/cc and melt index ($I_2$) of less than 2.0 g/10 min.

5. The liner of claim 1, wherein the at least one ply has a plateau seal strength of greater than 35 N/25 mm.

6. The liner of claim 1, wherein the at least one ply has a 2% secant modulus of greater than 250 MPa in the machine or transverse direction.

* * * * *